US009059458B2

(12) United States Patent
Nishimura et al.

(10) Patent No.: US 9,059,458 B2
(45) Date of Patent: Jun. 16, 2015

(54) REVERSE CONNECTION PREVENTING STRUCTURE FOR USE IN BATTERY-DRIVEN OBJECT DETECTION DEVICE

(71) Applicant: OPTEX CO., LTD., Shiga (JP)

(72) Inventors: Shinya Nishimura, Otsu (JP); Hiroyuki Ikeda, Otsu (JP)

(73) Assignee: OPTEX CO., LTD., Shiga (JP)

( * ) Notice: Subject to any disclaimer, the term of this patent is extended or adjusted under 35 U.S.C. 154(b) by 28 days.

(21) Appl. No.: 13/797,732

(22) Filed: Mar. 12, 2013

(65) Prior Publication Data
US 2013/0260181 A1  Oct. 3, 2013

(30) Foreign Application Priority Data

Mar. 27, 2012  (JP) ................................. 2012-070619

(51) Int. Cl.
H01M 2/00 (2006.01)
H01M 2/34 (2006.01)
H01M 2/10 (2006.01)
(52) U.S. Cl.
CPC ............ H01M 2/342 (2013.01); H01M 2/1055 (2013.01)
(58) Field of Classification Search
None
See application file for complete search history.

(56) References Cited

U.S. PATENT DOCUMENTS

| 5,197,889 | A | * | 3/1993 | Rizzo et al. | .................. 439/76.1 |
| 5,631,098 | A | * | 5/1997 | Suzuki | ............................. 429/1 |
| 6,359,418 | B1 | * | 3/2002 | Regan et al. | .................. 320/112 |
| 2010/0151313 | A1 | * | 6/2010 | Kosugi | ......................... 429/158 |
| 2011/0171505 | A1 | * | 7/2011 | Kishll et al. | ..................... 429/82 |
| 2011/0212348 | A1 | * | 9/2011 | Yasui et al. | ....................... 429/7 |
| 2012/0032682 | A1 | * | 2/2012 | Robertson | .................... 324/433 |

FOREIGN PATENT DOCUMENTS

JP      2000-082450 A      3/2000

* cited by examiner

Primary Examiner — Patrick Ryan
Assistant Examiner — Jose Colucci Rios
(74) Attorney, Agent, or Firm — Studebaker & Brackett PC

(57) ABSTRACT

Provided is a reverse connection preventing structure in a battery-driven object detection device, which has a simple structure capable of preventing reverse connection of even a battery whose projecting positive electrode is relatively lower in height. The structure has a holder for holding the battery including a first terminal for electrically connecting to a projecting positive electrode and a second terminal for electrically connecting to a negative electrode. The first terminal is formed in a printed circuit board. On the printed circuit board, an insulating member of less than 0.5 mm in thickness are provided around the circumference of the first terminal in such a manner as to allow the first terminal to come in contact with the positive electrode of the battery which is mounted correctly and as to prevent the first terminal from coming in contact with the negative electrode of the battery which is mounted reversely.

10 Claims, 8 Drawing Sheets

US 9,059,458 B2

REVERSE CONNECTION PREVENTING STRUCTURE FOR USE IN BATTERY-DRIVEN OBJECT DETECTION DEVICE

CROSS REFERENCE TO THE RELATED APPLICATION

This application is based on and claims Convention priority to Japanese patent application No. 2012-070619, filed Mar. 27, 2012, the entire disclosure of which is herein incorporated by reference as a part of this application.

FIELD OF THE INVENTION

The present invention relates to a reverse connection preventing structure for use in a battery-driven object detection device in which a detection unit for detecting objects is driven by a battery mounted in the device.

BACKGROUND OF THE INVENTION

Conventionally, known is an object detection device which detects objects using detection beams such as infrared rays (IR). Such an object detection device is provided with a detection unit composed of, for example, a light emitter which emits detection beams to a detection area and a light receiver which is disposed to oppose the light emitter and which receives the detection beams to output detection signals. The object detection device detects an object from a change in the amount of the detection beams (detection signal level) received by the light receiver, which change is caused when the object intercepts the beams.

In recent years, for the purpose of reduction in power consumption, time and effort for wiring, an increased number of object detection devices have been designed to be driven by batteries mounted inside the devices. In such devices, there sometimes occurs a so called a reverse connection, in which a battery is mounted into a battery holder with the predetermined polarity reversed by mistake. In this case, not only it is impossible to normally supply power to the device to enable detection operation, but also damage can be caused to the electric circuit of the device.

As an example of a structure for preventing the reverse connection, a battery holder which prevents reverse mounting of a battery 10 is known (JP Laid-open Patent Publication No.2000-82450), as shown in FIG. 7. The structure includes a holding member 50 to which a ring-shaped resin insulator 55 is provided so that the center hole 56 of the insulator 55 is aligned with a positive electrode contact portion 51 of the holding member 50. The insulator 55 allows a projecting positive electrode 11 of the battery 10 to enter into the hole 56, but prevents the battery 10 from being energized when the negative electrode 12 is mounted onto the positive electrode contact portion 51 due to reverse mounting of the battery 10.

As the battery 10 to be used for the device, various shapes of batteries are sold on the market. For example, as shown as a in FIG. 7, there is a battery whose positive electrode has a relatively lower projection height H of, for example, less than 0.5 mm, as compared to a projection height H0 of the standard positive electrode 11 from its end face. However, if the resin insulator 55 is produced by plastic injection molding, a limit of the thickness of the resin to be moldable is 0.5 to 0.6 mm. If the height of the projecting positive electrode 11 is less than 0.5 mm, since the thickness of the insulator 55 exceeds the height, the positive electrode 11 of the battery 10 cannot come in contact with the positive electrode contact terminal 51 of the holding member 50. Consequently contact failure will be caused. Accordingly, there have been cases where the types of batteries usable for the object detection device are limited.

Further, even in the case where the height of the positive electrode 11 is 0.5 mm or more, if the battery 10 has an outer covering member 15 which covers the entire side surface and the outer circumferences of the end surfaces of the battery, as shown in FIG. 8, and if an outer circumference covering portion 15a of the outer covering member 15 has a thickness T in the axial direction of the battery 10, then the substantial height of the positive electrode 11 of the battery 10, that is the distance between the surface of the outer circumference covering portion 15a and the end face of the positive electrode 11, lowers, and consequently contact failure will be caused similarly.

SUMMARY OF THE INVENTION

An object of the present invention is to solve the above-described problems and to provide a reverse connection preventing structure in a battery-driven object detection device which has a low-cost simple structure and is capable of preventing reverse connection even in the case of using a battery whose projecting positive electrode is low in height.

In order to attain the above-described object, a reverse connection preventing structure according to one aspect of the present invention which is used in an object detection device driven by a battery having a projecting positive electrode and a negative electrode prevents the battery from being connected reversely, and includes a holder for holding the battery. The holder includes a printed circuit board having at least circuit wiring; a positive electrode contact terminal formed on the printed circuit board for electrically connecting to the projecting positive electrode; a negative electrode contact terminal for electrically connecting to the negative electrode of the battery; and an insulating member of less than 0.5 mm in thickness provided around a circumference of the positive electrode contact terminal on the printed circuit board in such a manner as to allow the positive electrode contact terminal to come in contact with the projecting positive electrode of the battery which is correctly mounted and to prevent the positive electrode contact terminal from coming in contact with the negative electrode of the battery which is reversely mounted.

The detection unit described herein means a unit which has a light emitting unit and a light receiving unit, for example, and is configured such that the light emitting unit emits a detection beam and the light receiving unit receives the detection beam to detect an object based on the amount of the detection beams received by the light receiving unit.

The object detection device may correspond to each of the light emitting unit and the light receiving unit of an AIR type detection unit, and may correspond to the light receiving unit of a PIR type detection unit.

According to the configuration, since the insulating member of less than 0.5 mm in thickness is provided around the circumference of the positive electrode contact terminal on the printed circuit board in the battery holder, when a batteries are correctly mounted, the positive electrode contact terminal is allowed to come in contact with the positive electrode of the battery whose projection height is relatively lower but is greater than the thickness of the insulating members. Accordingly, electric power is supplied from the battery to the positive electrode contact terminal. On the other hand, when the battery is reversely mounted, the insulating member prevents the positive electrode contact terminal from coming in contact with the negative electrode of the battery, and thus energization from the battery can be prevented. Accordingly, with a low-cost simple structure, reverse connection prevention can be achieved even in the case of a battery whose projecting positive electrode is relatively lower in height.

Preferably, the insulating member is attached to the printed circuit board, and at a portion of the printed circuit board that the insulating member is attached to, no coating for preventing solder adhesion is formed. Accordingly, when attached to the printed circuit board with adhesive material such as a tackiness agent and a double-sided tape, the insulating members can be less likely to be removed.

Preferably, the insulating member is formed integrally with the printed circuit board. More preferably, the insulating member is formed on the printed circuit board by transferring or printing. Accordingly, manufacturing costs of the device can be reduced.

Further, when the battery has an outer covering member for covering the side surface and an outer circumference of one of end surfaces, the insulating member is preferably formed within an annular area on the printed circuit board that ranges from an outer periphery of the positive electrode contact terminals to a portion on the printed circuit board that faces an inner periphery of an outer circumference covering portion of the outer covering member. Even in the case where a battery is formed such that the projecting positive electrode is relatively lower in height and that the outer circumference covering portion of the outer covering member is relatively thicker in the axial direction, the insulating member does not come in contact with the outer circumference covering portion. Thus, the substantial height of the projecting positive electrode, that is the distance between the surface of the outer circumference covering portion 15a and the end face of the positive electrode 11, is not lowered, and reverse connection prevention can be achieved.

Still preferably, the insulating member is formed annularly such that the positive electrode contact terminal forms a center hole portion thereof. Accordingly, reverse connection prevention can be assuredly enhanced with a simple structure.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

In the accompanying drawings, like reference numerals are used to denote like parts throughout the several views, and.

DETAILED DESCRIPTION OF THE EMBODIMENTS

Figure 1:
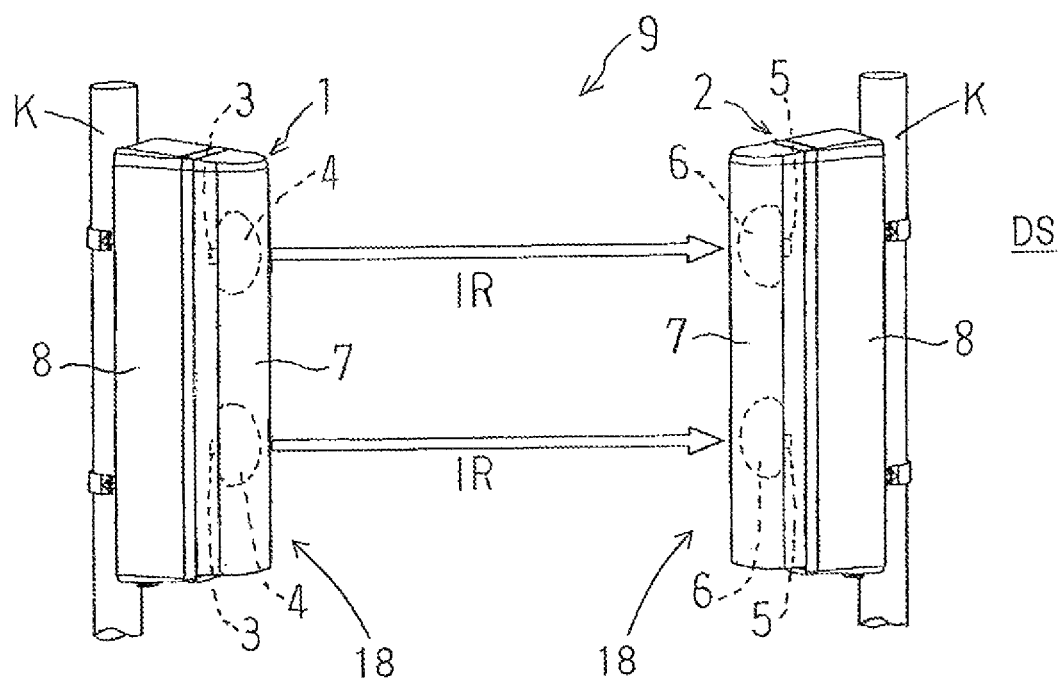
FIG. 1 is a schematic perspective view of an object detection system including battery-driven object detection devices each provided with a reverse connection preventing structure according to a first embodiment of the present invention.

Hereinafter embodiments of the present invention will be described with reference to the drawings. FIG. 1 shows an object detection system including object detection devices each provided with a reverse connection preventing structure according to an embodiment of the present invention. The object detection devices are driven by batteries, as will be described later. The object detection system DS is, for example, of an AIR type (active infrared ray type), and is provided with a detection unit 9 having a light emitting unit 1 and a light receiving unit 2 which is disposed in such a manner as to oppose the light emitting unit 1. Here, the light emitting unit 1 and the light receiving unit 2 each constitute the object detection device. The light emitting unit 1 may have two light emitting elements 3, 3 disposed in the vertical direction, and the light receiving unit 2 also has two light receiving elements 5, 5 which are disposed in the vertical direction and spaced at the same interval as the two light emitting elements 3, 3. Detection beams such as two infrared rays IR emitted from the two light emitting elements 3, 3 are received by the two light receiving elements 5, 5. The light emitting unit 1 and the light receiving unit 2 are mounted to mounting portions K such as poles, walls, and the like. It should be noted that the terms "upward", "downward", and "vertical direction" described herein are based on the state in which the light emitting unit 1 and/or the light receiving unit 2 are/is mounted to the mounting portions K.

The light emitting unit 1 and the light receiving unit 2 each have a casing 18 including a sensor cover 7 and a back box portion 8. The above-described light emitting elements 3, 3 and the light receiving elements 5, 5 are held in their corresponding sensor covers 7. The light emitting unit 1 has light emitting lenses 4, 4 which are associated with the respective light emitting elements 3, 3. The light receiving unit 2 has light receiving lenses 6, 6 which are associated with the respective light receiving elements 5, 5. The light emitting lenses 4, 4 and the light receiving lenses 6, 6 are also held in their corresponding sensor covers 7. Control sections each for controlling the light emitting unit 1 or the light receiving unit 2, driving powers, e.g., two batteries 10, 10 (FIG. 2) are held in the respective back box portions 8, 8.

The object detection system DS may be used as a security sensor system which outputs alarm signals as object detection signals. Based on a change in the amount of the detection beams (level of the detection signals) received by the light receiving unit 2, which is caused when an object intercepts the infrared rays IR, IR from the light emitting unit 1, the system detects the object and outputs alarm signals.

Figure 2:
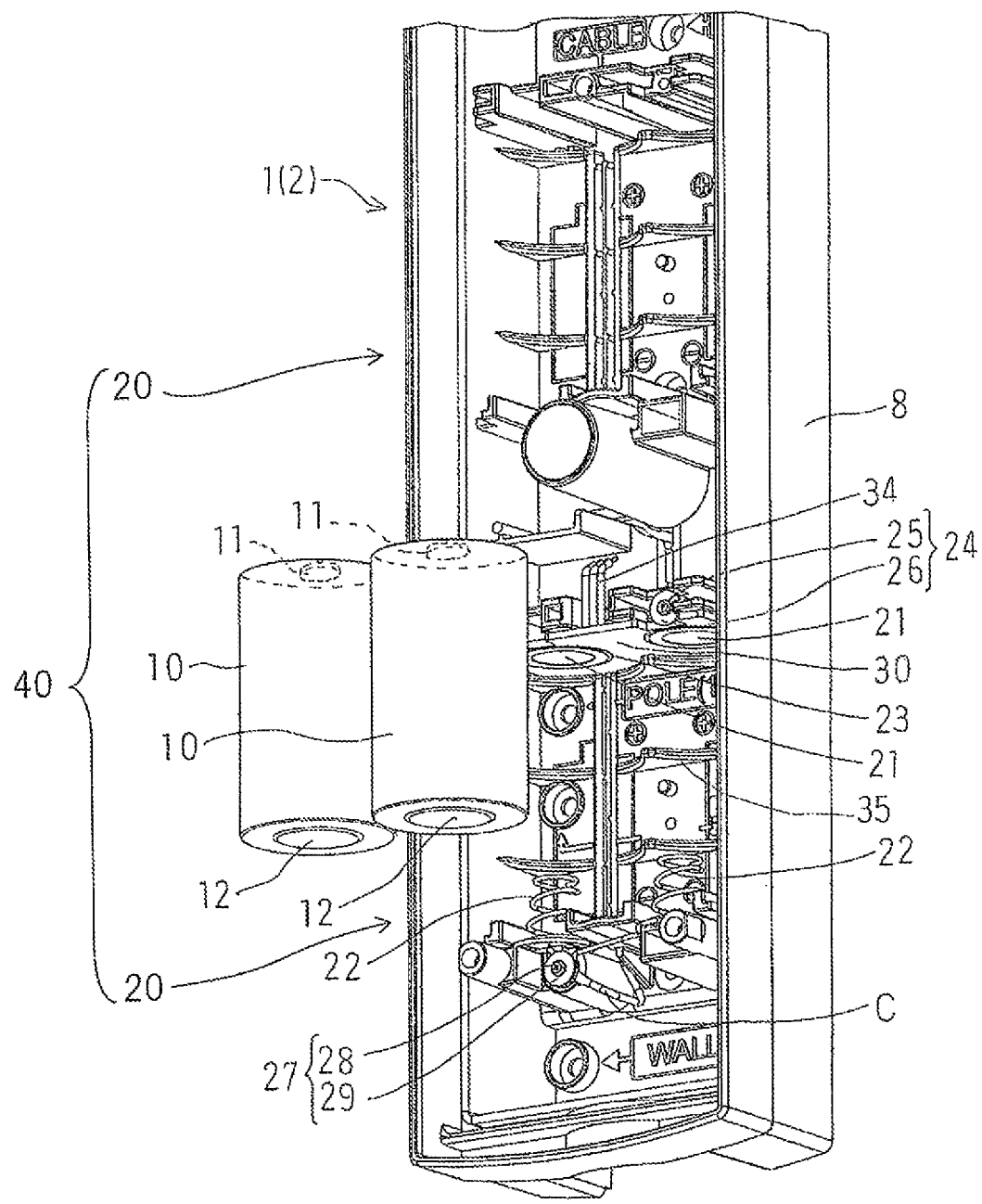
FIG. 2 is a perspective view of the object detection device shown in FIG. 1 viewed from its back side, illustrating the reverse connection preventing structure therein.

FIG. 2 shows an object detection device constituted of a light emitting unit 1. It should be noted that the configuration of the light emitting unit 1 described hereinbelow is also applied to the light receiving unit 2. The light emitting unit 1 includes a reverse connection preventing structure 40. The reverse connection preventing structure 40 may have a pair of holders 20, 20 which are disposed in the vertical direction and each configured to hold, for example, two batteries 10, 10, each of which includes a positive electrode 11 and a negative electrode 12. Each holder 20 may have a plate-shaped printed circuit board (PCB) 30 which at least includes circuit wiring. Each holder 20 also has two positive electrode contact terminals 21, 21 formed in the printed circuit board 30 to come in contact with the respective projecting positive electrodes 11, 11 of the batteries 10, 10 and negative electrode contact terminals 22, 22 which are configured to come in contact with the respective substantially-flat-shaped negative electrodes 12, 12 of the batteries 10, 10. The drawing shows the configuration of the holder 20 at the lower side only, and detailed illustration of the holder 20 at the upper side, which has the same configuration, is not provided.

The projecting positive electrode 11 of each the batteries 10 held by the holder 20 has a height of 0.5 mm or more, preferably between 0.5 mm and 1 mm.

Each positive electrode contact terminal 21 may be composed of a thin metallic film such as an evaporated metal film and a metal plating film formed in the printed circuit board 30, and are formed to be substantially flush with the printed circuit board 30. Each negative electrode contact terminal 22 is configured to be electrically connected to the negative electrode 12 of the battery 10, and presses the battery 10 in the axial direction by the spring force of a spring component S. Accordingly, the positive electrode 11 of the battery 10 assuredly comes in contact with the positive electrode contact terminal 21, and the negative electrode 12 also assuredly comes in contact with the negative electrode contact terminal 22. In addition, each battery 10 is held at its side by a plurality of curved side-securing members 35. Various types of batteries may be employed. In the case of using lithium batteries, for example, the lifetime of the batteries 10 can be extended when they are disposed such that the positive electrodes 11 face upward, as shown in FIG. 2.

The printed circuit board 30 has insulating members 23 of less than 0.5 mm in thickness each provided around the circumference of the positive electrode contact terminal 21 so as to allow the positive electrode contact terminal 21 to come in contact with the projecting positive electrode 11 of the battery 10 when the battery 10 is correctly mounted, and to prevent the positive electrode contact terminal 21 from coming in contact with the negative electrode 12 of the battery 10 when the battery 10 is reversely mounted. The insulating members 23 each may have an annular shape, and may preferably include an insulating film made of such material as polycarbonate and polyester. In this embodiment, the insulating films 23 are attached to the printed circuit board 30.

Figure 3:
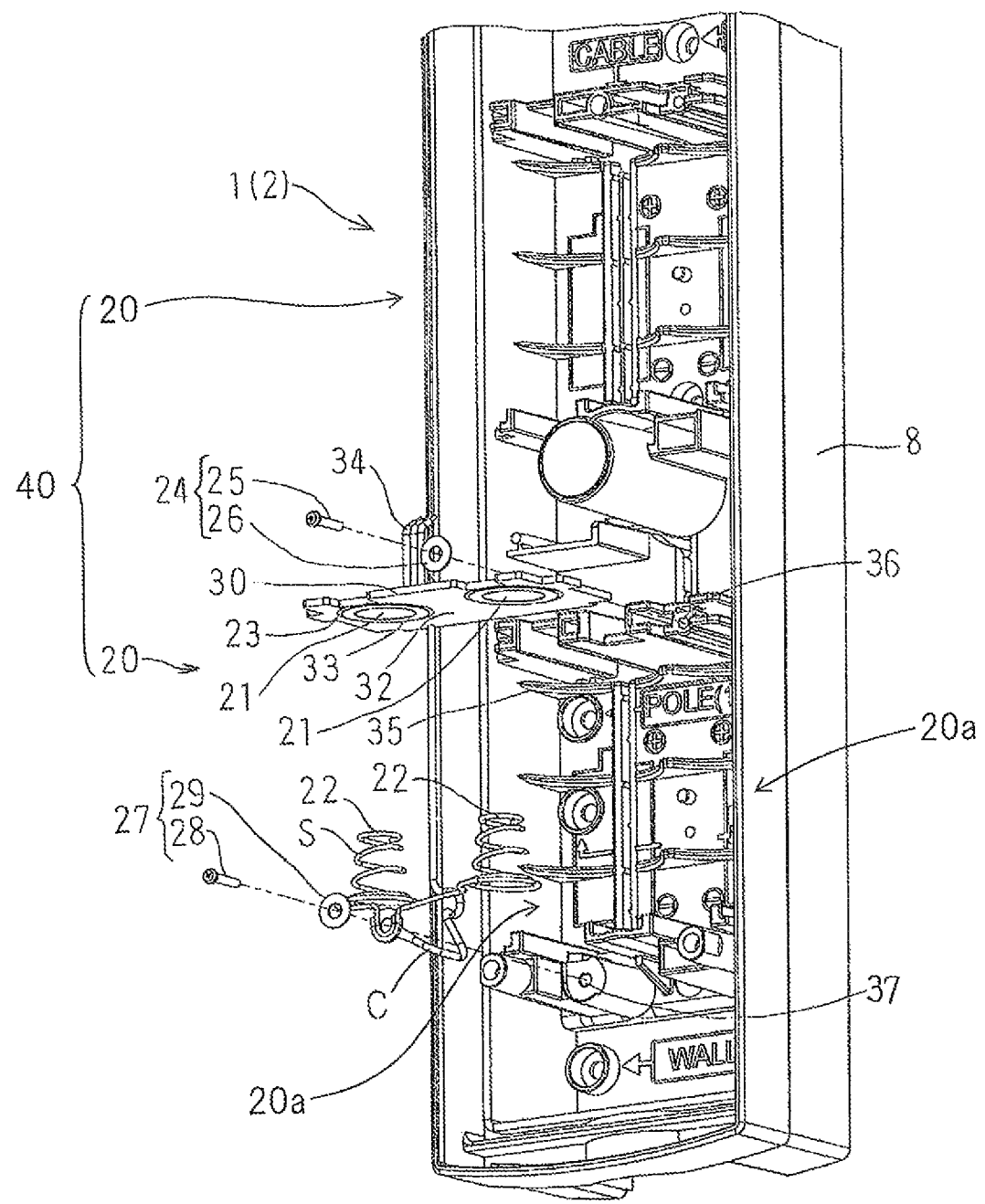
FIG. 3 is an exploded view of the reverse connection preventing structure shown in FIG. 2.

As shown in FIG. 3, the printed circuit board 30 is fixed to the holder 20 with a circuit board fixture 24, which is composed of a male screw 25 and a washer 26, by pressing the washer 26 to the printed circuit board 30, and by screwing the male screw 25 into a screw hole 36 via the washer 26. The negative electrode contact terminals 22, 22 formed of springs S, S are fixed to the holder 20 with a spring fixture 27, which is composed of a male screw 28 and a washer 29, by screwing the male screw 28 into a screw hole 37 via the washer 29. In this embodiment, two batteries 10 are serially connected through a connection line C, one of the terminals of which is fixed together with the base ends of the springs S, S by means of the spring fixture 27, and thereby electrically connected.

The light emitting unit 1 is supplied with power through power supply lines 34 leading from the printed circuit board 30.

The holder 20 may be composed of a plurality of holding sub-portions, for example, tow holding sub-portions 20a, 20a. Each holding sub-portion 20a holds single battery 10.

Figure 4:
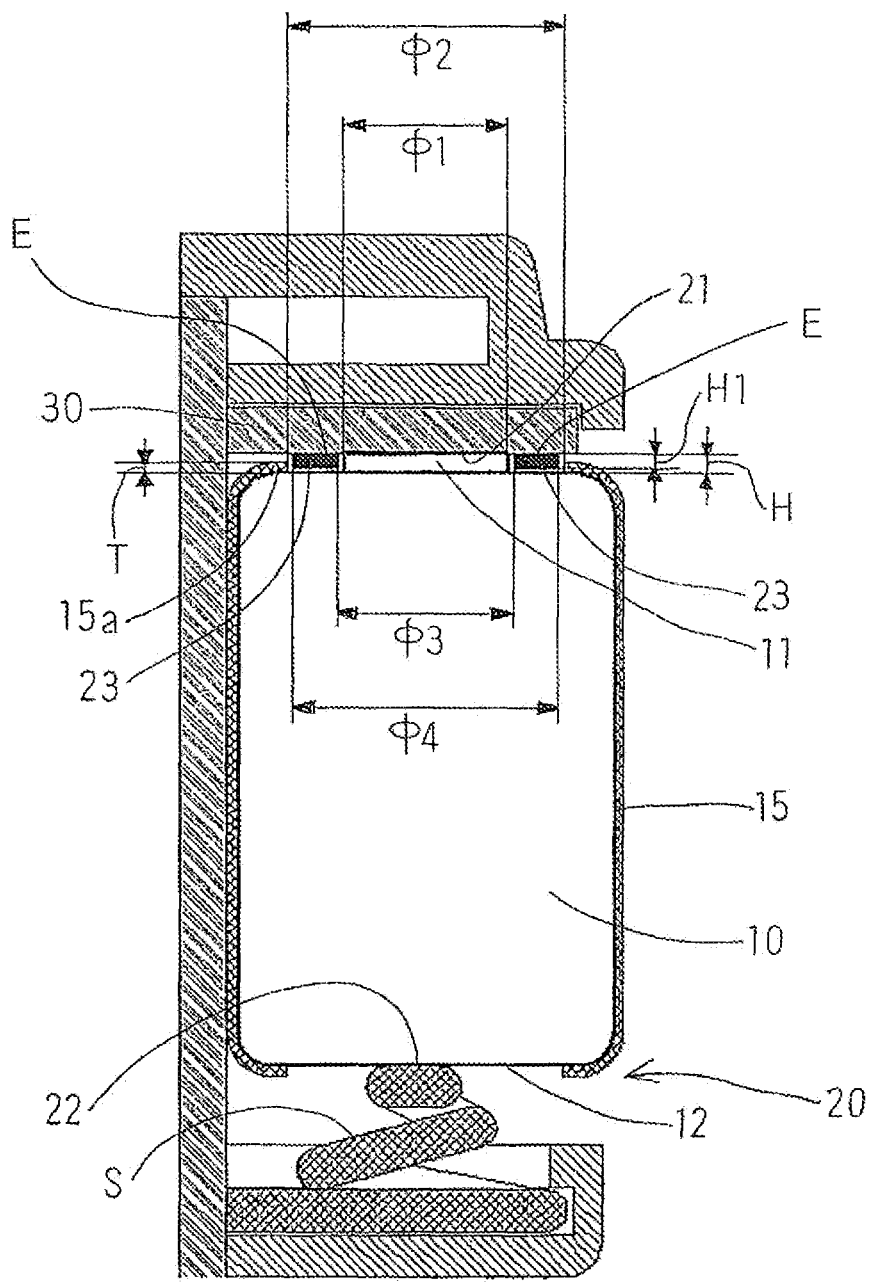
FIG. 4 is a schematic side cross-sectional view of the reverse connection preventing structure in the object detection device shown in FIG. 2.

FIG. 4 shows a schematic side cross-sectional view of the holding sub-portion 20a holding the battery 10. In the present embodiment, the insulating film 23 of less than 0.5 mm in thickness is annularly provided around the outer circumference of the positive electrode contact terminal 21 so that the center hole of the film 23 is aligned with the positive electrode contact terminal 21. A thickness H1 of the insulating film 23 is smaller than the projection height H of the projecting positive electrode 11 measured from the end surface of the battery 10 being in contact with the positive electrode contact terminal 21, and greater than a thickness T of a outer circumference covering portion 15a of an outer covering member 15 of the battery 10. That is, the relation of the thickness T of the outer covering member<the thickness H1 of the insulating film<the projection height H of the positive electrode is satisfied. With this relation, the battery 10 whose positive electrode 11 has the normal projection height such as the height of 0.5 mm or more, which is higher than the thickness H1 of the insulating film, is naturally allowed to come in contact with the positive electrode contact terminal 21. In the case that the printed circuit board 30 is formed to be smaller than an inscribed circle (a circle with an inner diameter of $\Phi 2$) of the inner periphery of the outer circumference covering portion 15a of the outer covering member 15, which will be described later, the projecting positive electrode 11 of the battery 10 is able to come in contact with the positive electrode contact terminal 21 even if the thickness H1 of the insulating film 23 is smaller than the thickness T of the outer circumference covering portion 15a of the outer covering member 15.

Figure 8:
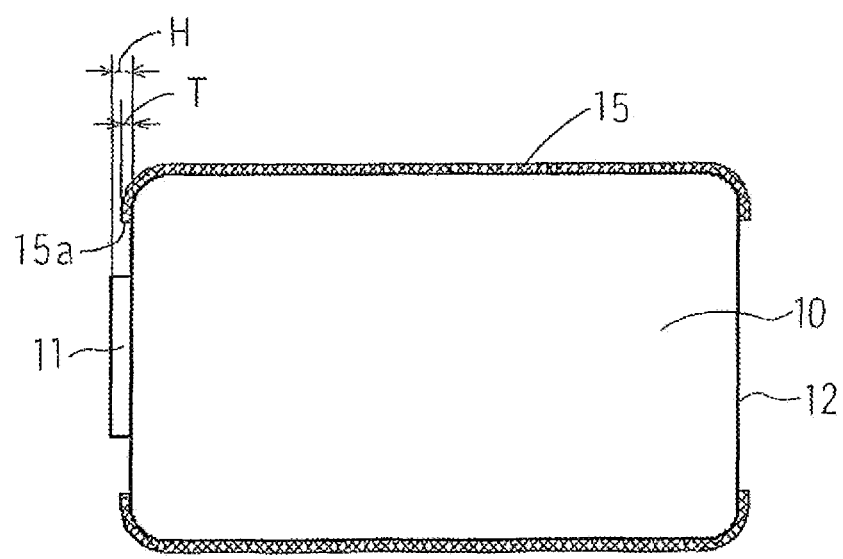
FIG. 8 is a side view of an exemplary general battery.

Further, the battery 10 to be held by the holding sub-portions 20a may have the outer covering member 15 which covers the side surface and outer circumferences of the end surfaces in the same manner as in the battery 10 shown in FIG. 8. The insulating film 23 is formed within an annular area E on the printed circuit board 30 that ranges from a circumscribed circle of the outer periphery of the positive electrode contact terminal 21 to a portion on the printed circuit board 30 that faces an inscribed circle of the inner periphery of the outer circumference covering portion 15a of the outer covering member 15 of the battery 10.

Figure 5A:
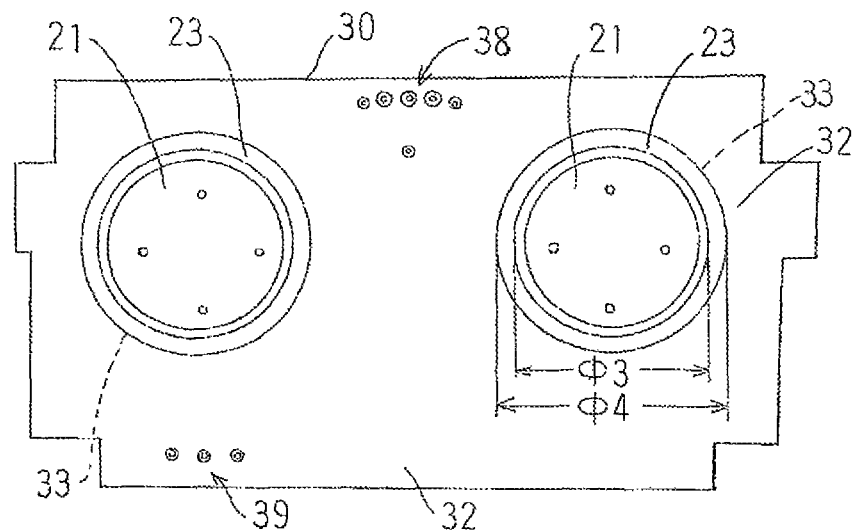
FIG. 5A is a back view of a printed circuit board in the reverse connection preventing structure shown in FIG. 2.

In particular, as shown in FIG. 5A, the annular insulating film 23 has an inner diameter of $\Phi 3$ and an outer diameter of $\Phi 4$. As shown in FIG. 4, the insulating film 23 is formed such that the inner diameter $\Phi 3$ is larger than the diameter $\Phi 1$ of the circumscribed circle of the outer periphery of the positive electrode 11 of the battery 10 ($\Phi 1 < \Phi 3$), which positive electrode 11 is in contact with the positive electrode contact terminal 21, and that the outer diameter $\Phi 4$ is smaller than the diameter $\Phi 2$ of the inscribed circle of the inner periphery of the outer circumference covering portion 15a of the outer covering member 15 ($\Phi 4 < \Phi 2$).

When the battery 10 is mounted correctly, the positive electrode contact terminal 21 is able to come in contact with a positive electrode 11 whose projection height is relatively lower but is greater than or equal to 0.5 mm, that is, greater than the thickness of the insulating film 23 disposed around the circumference of the positive electrode contact terminal 21. Thus, electric power is supplied from the battery 10 to the terminal 21. If the battery 10 is reversely mounted, due to interposition of the insulating film 23 having such a thickness, contact between the positive electrode contact terminal 21 and the negative electrode 12 of the battery 10 can be prevented, and thus energization from the battery 10 can be prevented.

Figure 5B:
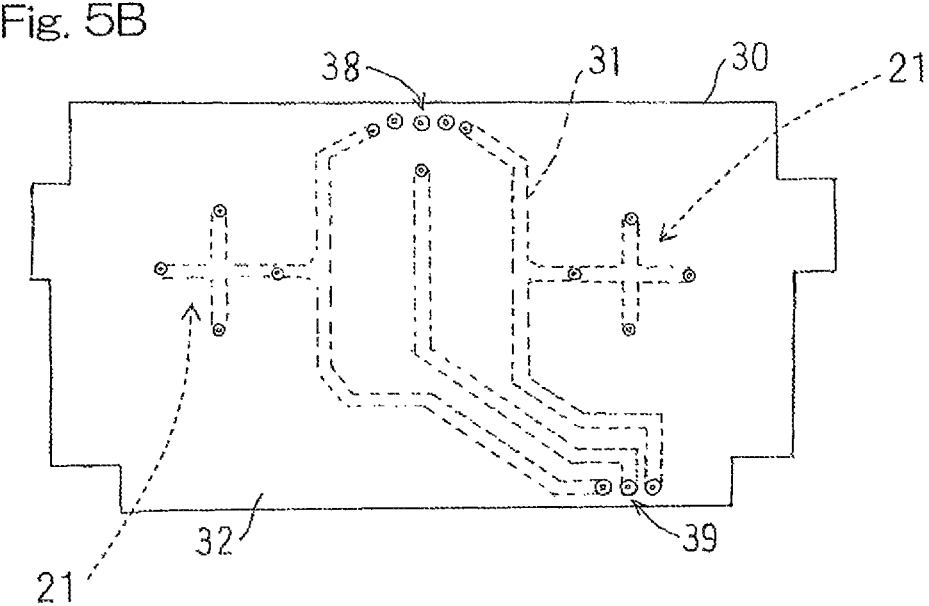
FIG. 5B is a plan view of the printed circuit board.

As shown in FIG. 5A, the printed circuit board 30 includes, in addition to the above-described positive electrode contact terminals 21, 21, one or more positive electrode external terminals 38 connected to the positive electrode contact terminals 21, 21, and one or more negative electrode external terminals 39 connected to the negative electrodes 12, 12 through the connection line C (FIG. 3). The power supply lines 34 (FIG. 2) are connected to the positive electrode external terminals 38. Further, as shown in FIG. 5B, the printed circuit board 30 includes circuit wiring 31 for connecting the positive electrode contact terminals 21, 21, the positive electrode external terminals 38, and the negative electrode external terminals 39.

Normally, on the front and back sides of a printed circuit board, a coating such as a resist and a solder mask is formed to prevent solder from adhering to unnecessary copper foil parts of the printed circuit board. However, if an insulating film is attached to the resist of the printed circuit board with adhesive material such as a tackiness agent and a double-sided tape, the adhesive material exhibits weak adhesive strength to the resist. Accordingly, there is a possibility that the insulating film will be caught by the projecting positive electrode of the battery when the battery is inserted or removed in the lateral direction, and will consequently be removed.

Therefore, at the portion of the printed circuit board 30 to which the insulating film 23 is attached, as shown in FIG. 5A, a coating 32 for preventing solder adhesion is not formed, which is formed at the remaining portion. That is, at a formation exclusion portion 33, the coating 32 such as the resist and solder mask for preventing solder from adhering to unnecessary copper foil parts of the printed circuit board 30 is not formed. Therefore, even on the printed circuit board 30, adhesive material exhibits a strong adhesive strength, and the insulating film 23 can be firmly stuck onto the printed circuit board 30. Thus, the insulating film 23 is less likely to be removed from the printed circuit board 30.

Further, because of a simple structure in which the insulating films 23, 23 are merely attached to the printed circuit board 30 including the positive electrode contact terminals 21, 21 and the circuit wiring 31, the cost of manufacturing the device can be reduced. Further, as shown in FIG. 5B, since the printed circuit board 30 includes the circuit wiring 31, working hours required for lead-wire connection can be reduced. Still further, if an electronic component such as an IC to be used for control is mounted on the printed circuit board 30, the device can be miniaturized.

Figure 6A:
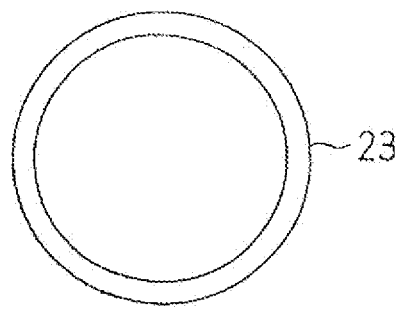
FIG. 6A is a plan view of an insulating member in the reverse connection preventing structure according to the first embodiment.
Figure 6B:
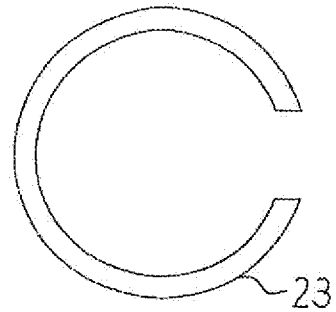
FIG. 6B is a plan view of an insulating member in a reverse connection preventing structure according to a second embodiment.
Figure 6C:
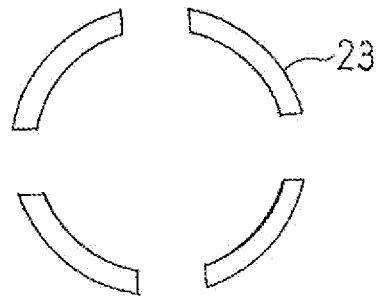
FIG. 6C is a plan view of an insulating member in a reverse connection preventing structure according to a third embodiment.
Figure 7:
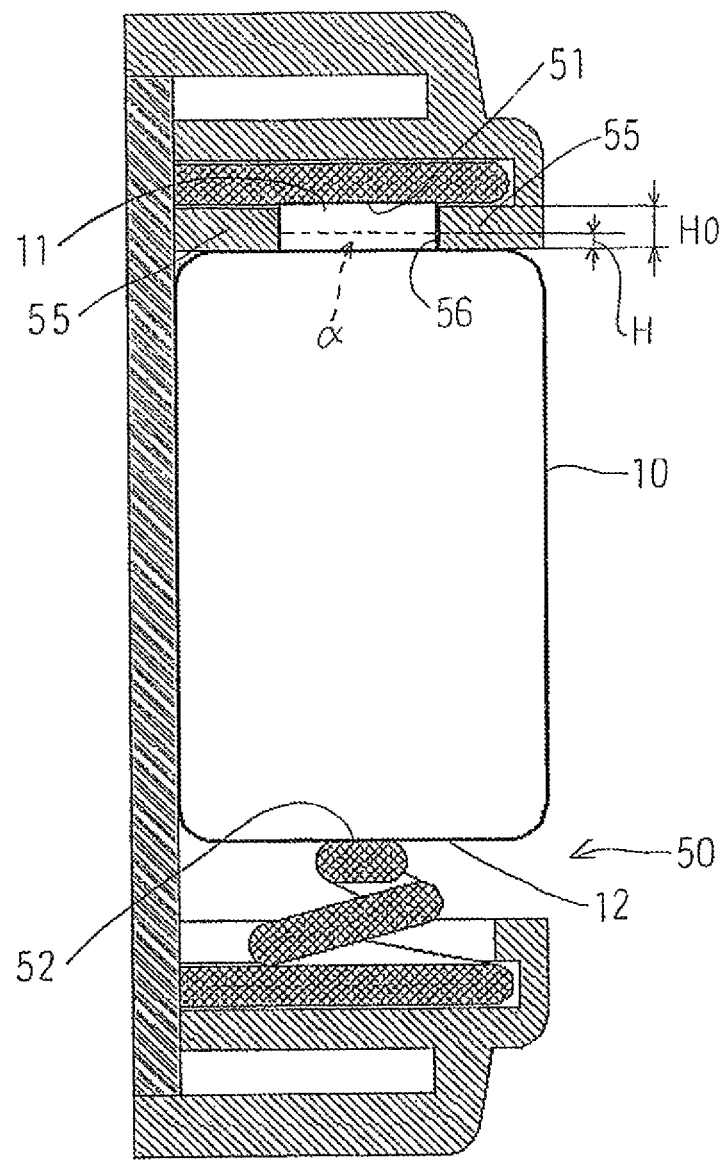
FIG. 7 is a schematic side cross-sectional view of a conventional reverse connection preventing structure in an object detection device.

In this embodiment, the insulating film 23 is of an annular shape, as shown in FIG. 6A, but it is not limited to the annular shape. For example, like a reverse connection preventing structure according to a second embodiment shown in FIG. 6B, the insulating film 23 may be of a C shape having a partial gap. Further, like a reverse connection preventing structure according to a third embodiment shown in FIG. 6C, the insulating film 23 may be formed of a plurality of film strips of a predetermined length disposed circumferentially at intervals. That is, the insulating film 23 may have any shape as long as it allows the positive electrode contact terminal 21 shown in FIG. 4 to come in contact with the circularly projecting positive electrode 11 of any batteries, and prevents the positive electrode contact terminal 21 from coming in contact with the negative electrode 12 of the batteries.

In this manner, in the reverse connection preventing structure according to each of the first to third embodiments, the printed circuit board 30 is provided with the insulating films 23 of less than 0.5 mm in thickness around the circumferences of the positive electrode contact terminals 21 of the holder 20 for holding the batteries 10, and thus when each battery 10 is correctly mounted, a contact is allowed between the corresponding positive electrode contact terminal 21 and the positive electrode 11 whose projection height is relatively lower but is greater than the thickness of the insulating member 23 to thereby cause the electric power to be supplied from the battery 10. On the other hand, when the battery 10 is reversely mounted, the insulating film 23 prevents a contact between the corresponding positive electrode contact terminal 21 and the negative electrode 12 of the battery 10 to thereby prevent energization from the battery 10. Accordingly, reverse connection prevention can be achieved with a low-cost simple structure even in the case of using batteries whose projecting positive electrodes are relatively lower in height.

In each of the above-described embodiments, the insulating films 23 are attached to the printed circuit board 30. However, the insulating films 23 may be formed integrally with the printed circuit board 30. Alternatively, the insulating films 23 may be formed on the printed circuit board 30 by transferring or printing. In the case, the insulating film is even less likely to be removed, and thus the manufacturing cost can be reduced.

The holder of the reverse connection preventing structure described in each of the above-described embodiments is designed to hold two batteries.

However, without limitation to this, the holder may be configured to hold any number of batteries.

In each of the above-described embodiments, the structure is applied to the object detection devices (light emitting unit and/or light receiving unit) of the AIR-type object detection system. However, the structure may be applied to a PIR-type object detection device. In addition, in each of the above-described embodiments, the infrared rays are used as detection beams. However, without limitation to this, any rays such as visible rays, microwaves, and lasers may be used.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . light emitting unit (object detection device)
2 . . . light receiving unit (object detection device)
9 . . . detection unit
10 . . . battery
11 . . . positive electrode
12 . . . negative electrode
20 . . . holder
21 . . . positive electrode contact terminal
22 . . . negative electrode contact terminal
23 . . . insulating member (insulating film)
30 . . . printed circuit board
31 . . . circuit wiring
40 . . . reverse connection preventing structure

What is claimed is:

1. A battery reverse connection preventing structure provided in an object detection device driven by a battery having a projecting positive electrode and a negative electrode for preventing the battery from being reversely connected, the structure comprising:

a holder for holding the battery,
the holder including:
a printed circuit board having wiring;
a positive electrode contact terminal formed on the printed circuit board for electrically connecting to the projecting positive electrode of the battery;
a negative electrode contact terminal for electrically connecting to the negative electrode of the battery and generating a spring force to press the battery toward the positive electrode contact terminal in an axial direction; and
an insulating member of less than 0.5 mm in thickness provided around a circumference of the positive electrode contact terminal on the printed circuit board in such a manner as to allow the positive electrode contact terminal to come in contact with the projecting positive electrode of the battery with a clearance formed between the surface of the insulating member and the end surface of the battery when the battery is correctly mounted to the holder and to prevent the positive electrode contact terminal from coming in contact with the negative electrode of the battery when the battery is reversely mounted to the holder.

2. The battery reverse connection preventing structure as claimed in claim 1, wherein
the insulating member is attached to the printed circuit board, and at a portion of the printed circuit board that the insulating member is attached to, no coating for preventing solder adhesion is formed.

3. The battery reverse connection preventing structure as claimed in claim 1, wherein
the insulating member is formed integrally with the printed circuit board.

4. The battery reverse connection preventing structure as claimed in claim 1, wherein
the insulating member is formed on the printed circuit board by transferring or printing.

5. The battery reverse connection preventing structure as claimed in claim 1, wherein
the battery has an outer covering member for covering the side surface and an outer circumference of one of end surfaces, and
the insulating member is formed within an area on the printed circuit board that ranges from an outer periphery of the positive electrode contact terminal to a portion on the printed circuit board that faces an inner periphery of an outer circumference covering portion of the outer covering member of the battery which is held by the holder.

6. The battery reverse connection preventing structure as claimed in claim 5, wherein
the insulating member is formed annularly such that the positive electrode contact terminal forms a center hole portion thereof.

7. The battery reverse connection preventing structure as claimed in claim 1, wherein
the insulating member includes an insulating film.

8. The battery reverse connection preventing structure as claimed in claim 7, wherein
the insulating film is produced from a material selected from either one of polycarbonate and polyester.

9. An object detection device provided with the battery reverse connection preventing structure as claimed in claim 1.

10. A battery reverse connection preventing structure provided in an object detection device driven by a battery having a projecting positive electrode which projects along an axial direction of the battery and a negative electrode for preventing the battery from being reversely connected where the battery has an outer covering member for covering the side surface and an outer circumference of an end surface on which the positive electrode is provided, the structure comprising:

a holder for holding the battery,
the holder including:
a printed circuit board having wiring;
a positive electrode contact terminal formed on the printed circuit board for electrically connecting to the projecting positive electrode of the battery;
a negative electrode contact terminal for electrically connecting to the negative electrode of the battery and generating a spring force to press the battery toward the positive electrode contact terminal in the axial direction; and
an insulating member of less than 0.5 mm in thickness provided around a circumference of the positive electrode contact terminal on the printed circuit board in such a manner as to allow the positive electrode contact terminal to come in contact with the projecting positive electrode of the battery with a clearance formed between the surface of the insulating member and the end surface of the battery when the battery is correctly mounted to the holder and to prevent the positive electrode contact terminal from coming in contact with the negative electrode of the battery when the battery is reversely mounted to the holder, wherein
the insulating member is formed within an area on the printed circuit board that ranges from an outer periphery of the positive electrode contact terminal to a portion on the printed circuit board that faces an inner periphery of an outer circumference covering portion of the outer covering member of the battery which is held by the holder.

* * * * *